May 16, 1961     J. P. MALEC     2,984,316

ADJUSTABLE AUTOMATIC OILER MEANS FOR AIR CONDUITS

Filed July 21, 1960

INVENTOR
JERRY P. MALEC
BY Talbert Dick & Darley
ATTORNEYS

WITNESS
NORMAN G. TRAVISS

United States Patent Office 2,984,316
Patented May 16, 1961

2,984,316

ADJUSTABLE AUTOMATIC OILER MEANS FOR AIR CONDUITS

Jerry P. Malec, 2578 Harney St., Omaha, Nebr.

Filed July 21, 1960, Ser. No. 44,342

7 Claims. (Cl. 184—55)

This invention relates to air line oilers and more particularly to an air conduit oiler that is adjustable and automatic in operation.

The use of a source of air under pressure to actuate pneumatic tools, equipment and like, is on the increase. The advantages are that the air power means is of light weight, fire hazard is eliminated, and noise level is reduced to a minimum. However, it is most difficult to oil or keep oiled the tools, equipment or like, that are being actuated by the air force. Attempts have been made to introduce oil directly into the air stream thus automatically lubricating the moving parts of the tools or equipment. Such devices, however, usually either seriously drop the air pressure at point of use, produce too much back pressure, or only operate intermittently when the air pressure flow is affected by the intermittent use of the air flow. In the first instance much efficiency is lost and in the latter instance some equipment would get too much oil, while other equipment using a substantially constant air stream would get little if any oil. Also, some tools, such as staplers, using only minimum air power would never be properly lubricated. While some of these problems were solved by the teachings of my Patent No. 2,945,560, issued date July 19, 1960, on an Adjustable Automatic Oiler for Air Conduits, the device was complicated and costly.

Therefore, one of the principal objects of my invention is to provide a single inexpensive air line oiler that functions continuously during the passage of the air stream to which it is associated.

A further object of this invention is to provide an air conduit oiler that does not materially reduce the air pressure stream passing from it.

A still further object of this invention is to provide an automatic oiler from an air pressure stream that introduces oil into the air stream without the air passing through the oil compartment.

A still further object of my invention is to provide a lightweight oiler for air lines that may be imposed in the line adjacent to the tool or equipment being used.

Still further objects of my invention are to provide an air line oiler that is capable of adjustment to compensate for various grades of oil, various air pressures, and various air volume usage.

Still further objects of this invention are to provide an air line oiler that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Figure 1:
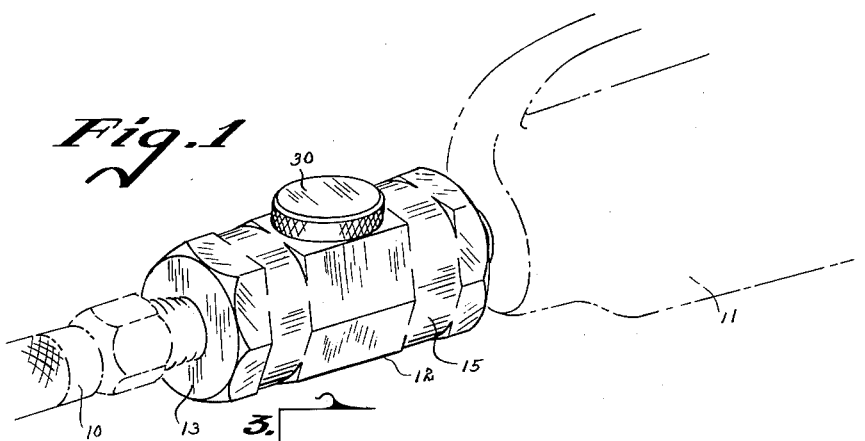
Fig. 1 is a perspective view of my oiler in use.
Figure 2:
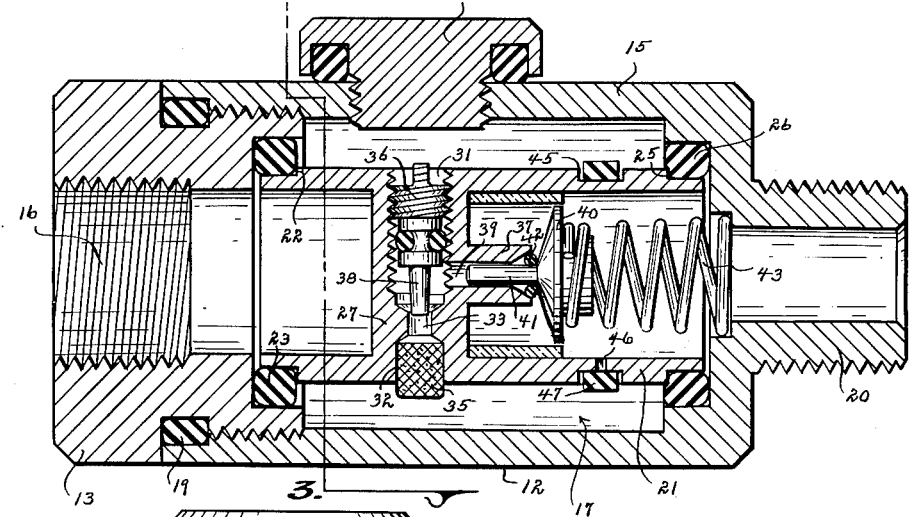
Fig. 2 is an enlarged longitudinal sectional view of the oiler and more fully illustrates its construction.
Figure 3:
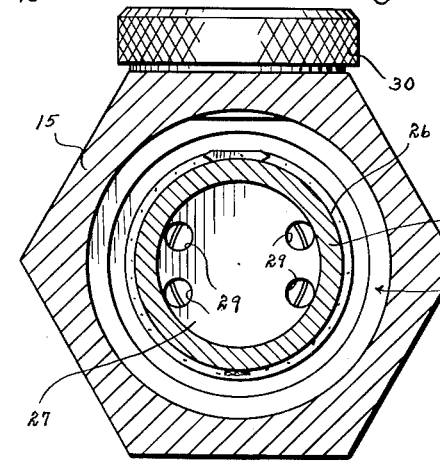
Fig. 3 is an enlarged cross sectional view of my device taken on line 3—3 of Fig. 2.

In these drawings I have used the numeral 10 to designate an air pressure conduit adapted to be in communication with a source of air under pressure. Secured to the exit end of the conduit is a pneumatic tool 11. My oiling means is imposed in the conduit and to the rear of the tool 11. The oiler is so light it may be a part of the end of the conduit and connected directly to the tool as shown in Fig. 1. The numeral 12 generally designates the barrel housing of the oiler and which consists of two parts, 13 and 15. The part 13 is the rear end cap portion having a large passageway 16 and into which the conduit 10 is detachably threaded. The part 15 has its rear end detachably threaded onto the forward end of the cap part 13 and has a substantial inner area 17, as shown in Fig. 2. A seal gasket 19 is between the part 13 and part 15. The numeral 20 designates a neck portion on the forward end of the part 15 for threading into the tool 11. Within the area 17 is a cylinder 21 having a diameter substantially less than that of the diameter of the inside of the part 15. At the rear end of the cylinder is a shoulder 22 engaging a ring gasket 23 that presses against the cap part 13. At the forward end of the cylinder is a shoulder 25 engaging a ring gasket 26 that presses against the forward inside end of the part 15. The inside of the cylinder is therefore sealed from inside of the part 15, but does communicate with the bore of the cap 13 and the neck 20 of the part 15. The numeral 27 designates a thick transverse wall in the cylinder. Extending through this wall are four air passageways 29. The space around the outer side of the cylinder and inside the part 15 is the oil supply area, and a supply of oil is placed therein through the detachable plug 30 threaded through the wall of the part 15. Extending into the wall 27 from the oil area is a well 31. Extending into the wall 27 from the oil area, and directly opposite from the well 31, is a well 32. These two wells 31 and 32 are connected by a passageway 33. Extending into the well 32 is a porous screen plug 35. Threaded into the well 31 is a valve core 36 having its projection 38 adjustably extending into the passageway 33.

The numeral 37 designates a centrally located forwardly extending projection on the forward side of the wall 27, having a through passageway 39 communicating with the well 31. The numeral 40 designates a bell extending forwardly and outwardly and having a centrally located valve stem extending rearwardly into the passageway 39. The outer end of the passageway 39 is tapered to extend forwardly and outwardly to receive an O-ring 42 embracing the stem 41. A coil spring 43 having one end engaging the neck portion 20 and its other end engaging the forward side of the bell 40, yieldingly holds the bell 40 in a direction toward the projection 37.

When my device is installed in an air hose and filled with oil, the air will intermittently pass through the opening 16, into the rear end of the cylinder 21, thence through the passageways 29, thence into the forward end of the cylinder 21 back of the bell 40, thence around the bell, and then out through the neck 20. Small amounts of oil will pass through the screen 35, thence into the passageway 33, thence past the valve stem or projection 38, thence through the passageway 39, thence past the O-ring 42 and onto the back of the bell 40. The oil will spread out and thin on the back of the bell as it approaches the outer edge of the bell. This is encouraged by the air stream and which will eventually carry the oil from the edge of the bell and through the neck 20 to the tool. The amount of oil to be dispensed is regulated by the threaded valve core 36, which is directly below the cap plug 30.

The oil compartment 17 is sealed from the inside of the cylinder 21, but the two are pressure equalized in one direction. This is accomplished by providing a groove 45 around the outer side of the cylinder. A passageway 46 communicate with this groove and the inside forward end of the cylinder. A rubber ring band 47 embraces the groove 45. By this arrangement, air may enter the oil compartment from the inside of the cylinder, but oil will be prevented from passing through the passageway 46. The air stream passing the bell 40 will tend to draw oil through the passageway 39.

Some changes may be made in the construction and arrangement of my Adjustable Automatic Oiler Means for Air Conduits without departing from the real spirit and purpose of my invention, and it is my intention to cover by my claims, any modified forms of structure or use of mechanical equivalents which may be reasonably included within their scope.

I claim:

1. In an air line oiler means, a barrel portion having an air inlet passageway in its rear end and an air and oil outlet passageway in its forward end, a cylinder inside said barrel portion having its rear end communicating with the inlet passageway of said barrel portion and having its forward end communicating with the outlet passageway of said barrel portion; said cylinder being of a diameter substantially less than that of the inside diameter of said barrel portion to provide an oil supply compartment between the outside of said cylinder and the inside of said barrel portion, a transverse wall in said cylinder, at least one air passageway through said wall, a well extending through one side of said cylinder and into said wall, an oil passageway extending through one side of said cylinder in said wall, and communicating with the lower area of said well, a valve stem threaded into said well and capable of extending into said last mentioned passageway, a projection on the forward side of said wall, an oil passageway extending through said projection and communicating with the inside of said well, a bell-shaped member in the forward end of said cylinder, a stud rod on said bell-shaped member slidably extending into the passageway that extends through said projection, and a spring means yieldingly holding said bell-shaped member toward said projection.

2. In an air line oiler means, a barrel portion having an air inlet passageway in its rear end and an air and oil outlet passageway in its forward end, a cylinder inside said barrel portion having its rear end communicating with the inlet passageway of said barrel portion and having its forward end communicating with the outlet passageway of said barrel portion; said cylinder being of a diameter substantially less than that of the inside diameter of said barrel portion to provide an oil supply compartment between the outside of said cylinder and the inside of said barrel portion, a transverse wall in said cylinder, at least one air passageway through said wall, a well extending through one side of said cylinder and into said wall, an oil passageway extending through one side of said cylinder in said wall, and communicating with the lower area of said well, a valve stem threaded into said well and capable of extending into said last mentioned passageway, a centrally located, forwardly extending projection on the forward side of said wall, an oil passageway extending through said projection and communicating with the inside of said well, a bell-shaped member in the forward end of said cylinder, a stub rod on said bell-shaped member slidably extending into the passageway that extends through said projection, and a spring means yieldingly holding said bell-shaped member toward said projection.

3. In an air line oiler means, a barrel portion having an air inlet passageway in its rear end and an air and oil outlet passageway in its forward end, a cylinder inside said barrel portion having its rear end communicating with the inlet passageway of said barrel portion and having its forward end communicating with the outlet passageway of said barrel portion; said cylinder being of a diameter substantially less than that of the inside diameter of said barrel portion to provide an oil supply compartment between the outside of said cylinder and the inside of said barrel portion, a transverse well in said cylinder, at least one air passageway through said wall, a well extending through one side of said cylinder and into said wall, an oil passageway extending through one side of said cylinder in said wall, and communicating with the lower area of said well, a valve stem threaded into said well and capable of extending into said last mentioned passageway, a projection on the forward side of said wall, an oil passageway extending through said projection and communicating with the inside of said well, a bell-shaped member having its outer side extending forwardly and outwardly in the forward end of said cylinder, a stub rod on said bell-shaped member slidably extending into the passageway that extends through said projection, and a spring means yieldingly holding said bell-shaped member toward said projection.

4. In an air line oiler means, a barrel portion having an air inlet passageway in its rear end and an air and oil outlet passageway in its forward end, a cylinder inside said barrel portion having its rear end communicating with the inlet passageway of said barrel portion and having its forward end communicating with the outlet passageway of said barrel portion; said cylinder being of a diameter substantially less than that of the inside diameter of said barrel portion to provide an oil supply compartment between the outside of said cylinder and the inside of said barrel portion, a transverse wall in said cylinder, at least one air passageway through said wall, a well extending through one side of said cylinder and into said wall, an oil passageway extending through one side of said cylinder in said wall, and communicating with the lower area of said well, a valve stem threaded into said well and capable of extending into said last mentioned passageway, a projection on the forward side of said wall, an oil passageway extending through said projection and communicating with the inside of said well, a bell-shaped member in the forward end of said cylinder, a stub rod on said bell-shaped member slidably extending into the passageway that extends through said projection, a one-way valve means for permitting air to pass from the inside of said cylinder to said oil supply compartment, and a spring means yieldingly holding said bell-shaped member toward said projection.

5. In an air line oiler means, a barrel portion having an air inlet passageway in its rear end and an air and oil outlet passageway in its forward end, a cylinder inside said barrel portion having its rear end communicating with the inlet passageway of said barrel portion and having its forward end communicating with the outlet passageway of said barrel portion; said cylinder being of a diameter substantially less than that of the inside diameter of said barrel portion to provide an oil supply compartment between the outside of said cylinder and the inside of said barrel portion, a transverse wall in said cylinder, at least one air passageway through said wall, a well extending through one side of said cylinder and into said wall, an oil passageway extending through one side of said cylinder in said wall, and communicating with the lower area of said well, a valve stem threaded into said well and capable of extending into said last mentioned passageway, a projection on the forward side of said wall, an oil passageway extending through said projection and communicating with the inside of said well, a bell-shaped member in the forward end of said cylinder, a stub rod on said bell-shaped member slidably extending into the passageway that extends through said projection; and a screen plug in the oil passageway of said wall, and a spring means yieldingly holding said bell-shaped member toward said projection.

6. In an air line oiler means, a barrel portion having an air inlet passageway in its rear end and an air and oil outlet passageway in its forward end, a cylinder inside said barrel portion having its rear end communicating with the inlet passageway of said barrel portion and having its forward end communicating with the outlet passageway of said barrel portion; said cylinder being of a diameter substantially less than that of the inside diameter of said barrel portion to provide an oil supply compartment between the outside of said cylinder and the inside of said barrel portion, a transverse wall in said cylinder, at least one air passageway through said wall, a well extending through one side of said cylinder and into said wall, an oil passageway extending through one side of said cylinder in said wall, and communicating with the lower area of said well, a valve stem threaded into said well and capable of extending into said last mentioned passageway, a projection on the forward side of said wall, an oil passageway extending through said projection and communicating with the inside of said well, a bell-shaped member in the forward end of said cylinder, a stub rod on said bell-shaped member slidably extending into the passageway that extends through said projection, a detachable oil filler cap in the wall of said barrel portion and positioned over the well in said wall, and a spring means yieldingly holding said bell-shaped member toward said projection.

7. In an air line oiler means, a barrel portion having an air inlet passageway in its rear end and an air and oil outlet passageway in its forward end, a cylinder inside said barrel portion having its rear end communicating with the inlet passageway of said barrel portion and having its forward end communicating with the outlet passageway of said barrel portion; said cylinder being of a diameter substantially less than that of the inside diameter of said barrel portion to provide an oil supply compartment between the outside of said cylinder and the inside of said barrel portion, a transverse wall in said cylinder, at least one air passageway through said wall, a well extending through one side of said cylinder and into said wall, an oil passageway extending through one side of said cylinder in said wall, and communicating with the lower area of said well, a valve stem threaded into said well and capable of extending into said last mentioned passageway, a projection on the forward side of said wall, an oil passageway extending through said projection and communicating with the inside of said well, a bell-shaped member in the forward end of said cylinder, a stub rod on said bell-shaped member slidably extending into the passageway that extends through said projection, and a spring means yieldingly holding said bell-shaped member toward said projection; said barrel portion comprising two detachable screwed together parts.

References Cited in the file of this patent
UNITED STATES PATENTS

| | | |
|---|---|---|
| 408,460 | Capitaine | Aug. 6, 1889 |
| 1,621,771 | Egan | Mar. 22, 1927 |
| 1,688,827 | Nelson | Oct. 23, 1928 |
| 1,828,185 | Hansen | Oct. 20, 1931 |
| 2,613,067 | Goodyer | Oct. 7, 1952 |
| 2,707,529 | Monnier | May 3, 1955 |
| 2,730,269 | Earle | Jan. 10, 1956 |
| 2,783,034 | Jones | Feb. 26, 1957 |
| 2,945,560 | Malec | July 19, 1960 |